United States Patent [19]

Knowles et al.

[11] 4,050,037

[45] Sept. 20, 1977

[54] LASER BEAM ALIGNMENT

[75] Inventors: C. Harry Knowles, Moorestown; John R. Meckley, Mount Laurel; Charles A. Naylor, Sewell, all of N.J.

[73] Assignee: Metrologic Instruments, Inc., Bellmawr, N.J.

[21] Appl. No.: 694,606

[22] Filed: June 10, 1976

[51] Int. Cl.² ........................................... H01S 3/086
[52] U.S. Cl. ................................ 331/94.5 D; 350/252
[58] Field of Search ................ 331/94.5; 350/252, 255

[56] References Cited

U.S. PATENT DOCUMENTS

| 3,225,307 | 12/1965 | Weissman | 331/94.5 D |
| 3,478,608 | 11/1969 | Met | 331/94.5 D |
| 3,753,150 | 8/1973 | Zar | 331/94.5 D |

Primary Examiner—William L. Sikes
Attorney, Agent, or Firm—Paul & Paul

[57] ABSTRACT

A laser tube is rigidly mounted within a cylindrical metallic housing, and end rings are attached thereto. Each end ring has an opening for passage of the beam, and a plurality of radially disposed openings. Inside the housing, a smaller adjustment ring is provided, and outside the end rings are reference rings adapted to receive lenses, filters, or the like. Screws engage and penetrate the outer ring, pass freely through the end ring, and engage the inner ring. The outer and inner rings are movably adjustable relative to the housing axis and the laser beam, whereby optical apparatus attached to the outer ring may be positioned precisely relative to the laser beam.

8 Claims, 4 Drawing Figures

LASER BEAM ALIGNMENT

BACKGROUND OF THE INVENTION

This invention relates to laser apparatus, and more particularly to beam alignment apparatus for lasers, especially for lasers having cylindrical housings.

The most common serious aberration in collimated laser beams is chiefly caused by the beam being nonconcentric with lenses attached to the laser. That is, if the beam emerging from the laser tube does not precisely address the lenses attached to the laser, the beam will be subjected to uneven and unpredictable bending.

It is a primary objective of the present invention to provide laser beam alignment apparatus which insures that the beam is presented precisely in the middle of lenses, filters, and the like optical apparatus utilized in conjunction therewith.

Difficulties attendant to poorly aligned laser apparatus further arise due to irregularities in the lenses themselves. Even relatively high quality, carefully designed components often involve some degree of non-concentric configuration due to the mounting of the component within its frame, or perhaps even due to aberrations in the lens itself.

It is a further object of the present invention to provide beam alignment apparatus which quickly and easily can account for, and correct aberrations in the lenses or the lens mounting materials.

In one class of commercially available prior art system, a laser is encapsulated in a cylindrical housing, which is mounted on a complex lathe fixture. The beam from the laser is centered with respect to rings by alignment on the lathe, whereupon grooves are machined into the housing at either end. Those grooves are aligned with the beam such that the laser may be put in and out of a precision optical system repeatably having the laser beam lined up with the optical system. Hence, in that prior art system, one would line up the laser with respect to a base and line up the optics with respect to that same base, whereupon the tube could be moved in and out of the base without adjustment.

The foregoing prior art method involves substantial inconveniences, however, correction of which are also primary objects of the present invention as follows.

It is an object that embodiments of the present invention be totally field alignable, such that the user can choose not only the method of alignment, but also the degree of precision desired. It is a further object that such embodiments be capable of mass production in accordance with conventionally known techniques, such that the alignment apparatus itself can be utilized to compensate for production tolerances. It is a still further object that embodiments of the present invention allow for modular assembly of plural optical component systems, including spacial filters, collimating telescopes, plural lens systems, and the like.

SUMMARY OF THE INVENTION

The present invention substantially achieves the foregoing objects by utilizing a plural part alignment scheme, at least one part of which is rigidly affixed to the tube housing, and other parts of which are movably adjustable together with respect to the fixed part. The lenses, filters, and other optical components are affixed to, and therefore are adjustable with the two adjustable parts.

In an illustrative embodiment, a first ring is rigidly attached to an outer housing, into which the laser tube is rigidly mounted. This fixed ring has a passage in its center for the beam, and has openings therearound for free passage of adjustment screws. Those screws penetrate and threadedly engage rings immediately outside and inside the enclosure at the fixed ring, and thereby are movable with respect to the axis of the housing and to the beam itself. Lenses, filters, and the like are carried by the outer adjustable member, and thereby are also movable, to the extent of precision desired, relative to the beam itself.

DETAILED DESCRIPTION

Figure 1:
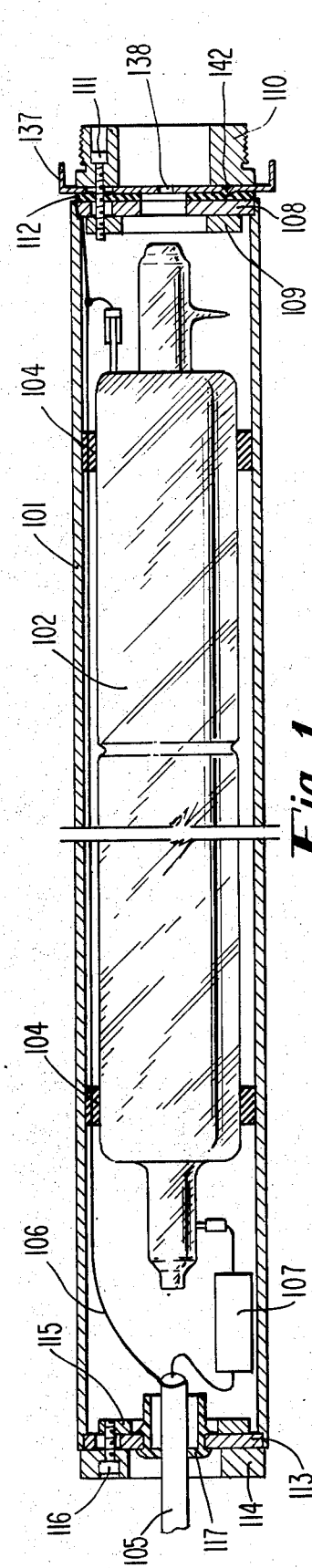
FIG. 1 shows a cut away view of a laser assembly including alignment apparatus in accordance with the present invention.
Figure 2:
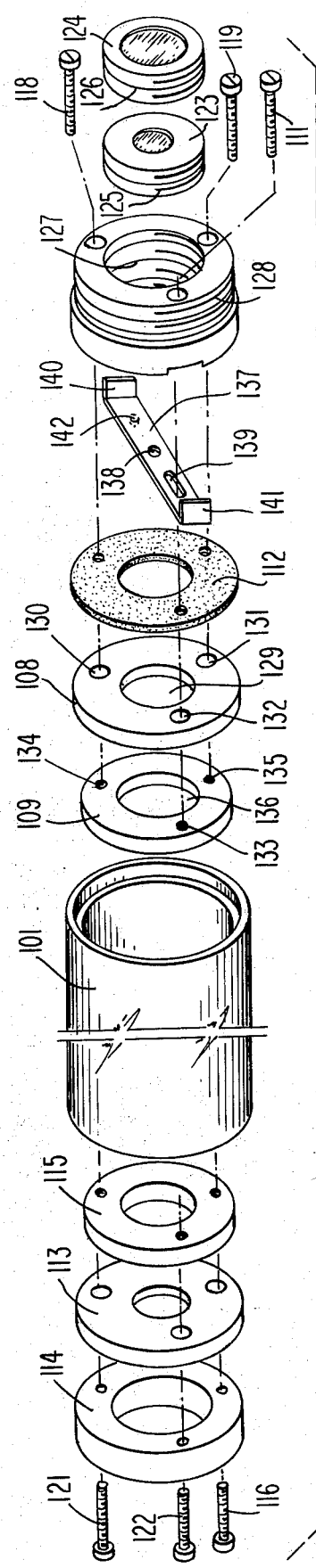
FIG. 2 shows a exploded view of the embodiment of FIG. 1, including a diverging lens doublet.

In FIGS. 1 and 2, a gas laser tube is rigidly mounted within an elongated cylindrical housing 101. In a preferred embodiment, the housing 101 is metallic in composition, and the glass tube 102 is affixed therein by means of collars 103 and 104, advantageously composed of rubber or the like. A power cable 105 penetrates the left most side of the tube shown, and the electrical ballast including connection wires and associated apparatus 106 and 107 is sealed within the housing 101. A pair of rings 108 and 113 are attached at either end of the housing 101. In a preferred embodiment, rings 108 and 113 are attached by swaging, and each is open at the center (129 for ring 108), and each includes a plurality of openings, preferably three, radially disposed outwardly from the inner opening (130, 131, and 132 for ring 108). The center opening 129 for ring 108 allows passage of the laser beam, and the center opening for ring 103 permits passage of cable 105 therethrough. As shown in FIG. 1, cable 105 enters ring 113 in sealed fashion by means of a flexible grommet 117 or the like.

Referring first to the right hand section of the embodiment of FIGS. 1 and 2, an inner ring 109 having a diameter smaller than the inner diameter of housing 101 is adjacent the inside edge of fixed ring 108. Ring 109 has a central opening 136 for passage of the laser beam, and threaded openings 133, 134, and 135 which correspond respectively to the larger openings 130, 131, and 132 of ring 108. Immediately adjacent the outside of ring 108 is a rubber gasket 112, discussed hereinafter, and next adjacent is a ring 110 which also has an opening at its center 127 for passage of the beam, and which has threaded openings also corresponding to the larger openings 130 through 132 in ring 108. Screws 111, 118, and 119 penetrate and threadedly engage the threaded openings in the reference ring 110, pass freely through respectively corresponding openings 130 through 132 in ring 108, and penetrate and threadedly engage openings 133 through 135 of the inner adjustable ring 109. Openings 130 through 132 of the fixed ring 108 allow clearance for screws 111, 118, and 119, such that adjustable rings 109 and 110 may be moved together relative to the fixed ring 108, and thereby also to the housing 101 and to the beam issuing from laser tube 102. The outer reference ring 110 has a protuberance 128 directed outwardly thereof, which has threading on its inner and outer surfaces. Both threaded surfaces may be utilized to engage lenses, spacial filters, collimators, and the like. As shown in FIG. 2, a lens doublet 123 and 124 includes threaded mountings 125 and 126 which engage the inner surface of protuberance 128 of reference ring 110. Alternate framing configurations utilize the outer threading on protuberance 128 of reference ring 110. Accordingly, when one or more lenses are mounted on reference ring 110, and when the laser beam from tube 102 is energized, rings 109 and 110 may be manipulated together to alter the point of presentation of the beam to the optical components such as 123 and 124. Whenever a desired orientation is achieved, screws 111, 118, and 119 are tightened, such as by use of an allen wrench in conjunction with the hexagonal indentation in the screw heads. Once the screws thereby are tightened, precise beam orientation and configuration is maintained. Thereafter, should different optical components having different orientations be substituted for lenses such as 123 and 124, the adjustment procedure may be repeated as desired.

The rubber gasket 112 provides a dual function, including a sealing of the apparatus in conjunction with the tightened screws 111, 118, and 119, and also to provide controlled force against the operation of a shutter stop 137. The gasket 112 has holes for free passage of the screws 111, 118, and 119, and when those screws are tightened, the gasket 112 becomes compressed as desired. The shutter stop 137 comprises a bar which rides in a matable slot on the inner surface of ring 110. As shown, the shutter 137 includes flanges 140 and 141 at either extremity, allowing it to be displaced in the slot of ring 110, and thereby to maneuver an opening 138 at the center of the shutter 137. Accordingly, displacement of the bar back and forth allows capability either for blocking or passage of the laser beam. As shown, the bar 137 includes a slot 139 for passage of a screw such as 119, and also includes a dimple 149 which bears against the gasket 112 and provides frictional resistance to movement.

In order to provide a complete alignment capability, the power input side of the tube, shown on the left portion of FIGS. 1 and 2, includes a similar adjustment mechanism. That is, fixed ring 113 is bonded to the housing 101, and outer and inner adjustment rings 114 and 115 cooperate with screws 116, 121, and 122 in a similar fashion to that set forth with respect to rings 108, 109, and 110 of the right hand portion of the tube.

Figure 3:
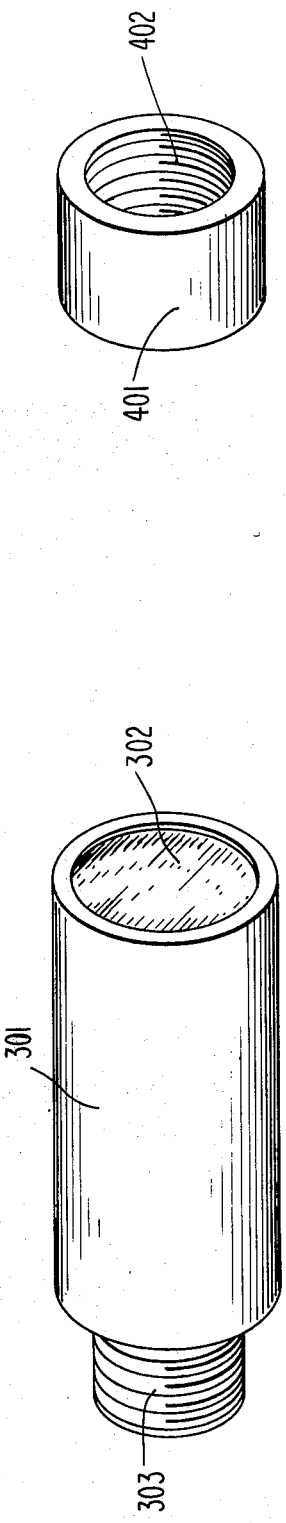
FIG. 3 shows a collimator telescope assembly attachable to the embodiment of FIGS. 1 and 2.
Figure 4:
FIG. 4 shows an adapter mount for the embodiment of FIGS. 1 and 2, which allows for modular attachment of sundry other optical assemblies.

FIG. 3 shows a collimator telescope assembly and FIG. 4 shows an adapter mount, both of which may be utilized in conjunction with the embodiment of FIGS. 1 and 2 in modular fashion. In FIG. 3, a metal telescope housing 301 has a lens 302 at one end, and a screw collar 303 at the other end, which it matable directly with protuberance 128 of adjustment ring 110, or by means of the FIG. 4 adapter mount, which includes a collar 401 having a threaded interior 402 engaging the protuberance 128 of ring 110. It will be apparent that numerous other modular components, including spacial filters, further lens combinations, and the like may be utilized in association with adapters such as shown in FIG. 4, directly with the protuberance 128 of ring 110, or with other similar apparatus.

We claim:

1. In a laser system having a laser tube rigidly mounted within a hollow, generally cylindrical housing, beam alignment apparatus comprising:

first means, rigidly attached to an end of said housing, having an opening for passage of the laser beam, and a plurality of other openings into said housing;

second means, movable within said housing, having an opening for passage of the laser beam, and threaded openings corresponding respectively to said other openings in said first means;

third means, adapted to receive optical apparatus generally in the path of the laser beam, said third means having threaded openings respectively associated with the threaded openings in said second means; and a plurality of screws, each in rigid threaded engagement with respectively corresponding ones of said threaded openings in said second means and in said third means, said screws being smaller than and freely penetrating said other openings in said first means, wherein said second and third means are annular, and with said screws loosened are transversely movable together relatively to said first means and to the laser beam, and with said screws tightened, are adjusted at a fixed position relatively to said first means and to the laser beam.

2. Apparatus as described in claim 1, wherein said third means includes a cylindrical protuberance depending outwardly away from said first means and enclosing the laser beam, said protuberance being threaded on its inner and outer surface for receipt of select optical apparatus.

3. Apparatus as described in claim 2, wherein said first means is generally annular in shape, smoothly conforming on its outer periphery to said end of said housing.

4. Apparatus as described in claim 2, and further including a plurality of lenses in threaded engagement with the inner surface of said protuberance and coaxial therewith.

5. Apparatus as described in claim 2, and further including collimating telescope means in threaded engagement with said protuberance and coaxial therewith.

6. Apparatus as described in claim 2, wherein said third means defines a diametrical slot on the surface of said third means facing said first means, and wherein said apparatus further comprises an elongated shutter bar matable with said slot, said bar diametrically protruding a predetermined distance outside said third means and having an opening for passage of said beam movable by displacement of said bar.

7. Apparatus as described in claim 6, and further including a flexible washer between said first and third means, wherein said shutter bar includes a protuberance against said washer for frictional engagement therewith.

8. Apparatus as described in claim 1, and further including:

fourth means, rigidly attached to the opposite end of said housing, having an opening about the axis of said housing, and a plurality of other openings into said housing;

fifth means, movable within said housing, having an opening about said axis, and threaded openings corresponding to said other openings in said fourth means;

sixth means, having an opening about said axis and threaded openings respectively associated with the threaded openings in said fifth means; and a plurality of screws in threaded engagement with said threaded openings in said fifth and sixth means, and freely penetrating said other openings in said fourth means.

* * * * *